United States Patent Office 2,938,004
Patented May 24, 1960

2,938,004

ADDUCTS OF AROMATIC POLYAMINES AND MONOEPOXIDES

Ronald L. De Hoff, Springfield, and Harvey L. Parry, Union, N.J., assignors to Shell Oil Company, a corporation of Delaware No Drawing. Filed Apr. 28, 1955, Ser. No. 504,681

17 Claims. (Cl. 260—2)

This invention relates to new amine adducts. More particularly, the invention relates to new complex adducts of polyamines and monoepoxides which are particularly valuable as curing agents for polyepoxides, and to a method for preparing the new adducts.

Specifically, the invention provides new and particularly useful compositions comprising complex soluble adducts of aromatic polyamines and monoepoxides having a terminal epoxy group, which adducts are prepared by heating the monoepoxide with the aromatic polyamine in a molar ratio of more than 1:2.

The application is a continuation-in-part of our application Ser. No. 371,148, filed July 29, 1953.

Polyepoxides, such as glycidyl polyethers of polyhydric phenols, have been cured with various basic substances including some amines. Meta-phenylene diamine is particularly good as a curing agent for these materials as it gives products which retain their hardness and strength at elevated temperatures and have good resistance against solvents. Aromatic polyamines, such as meta-phenylene diamine, however, are solid and generally require melting before they can be properly dispersed in compositions containing the liquid polyepoxides. In addition, castings prepared by the use of these amines are not as hard at the elevated temperatures or as solvent resistant as required for certain applications.

It is an object of the invention, therefore, to provide a new class of amine adducts. It is a further object to provide new adducts of polyamines and monoepoxides and a method for their preparation. It is a further object to provide new complex soluble adducts of polyamines which are liquid and easily dispersed in liquid compositions containing polyepoxides. It is a further object to provide new liquid adducts of polyamines and monoepoxides which are superior curing agents for polyepoxides. It is a further object to provide liquid soluble adducts of polyamines and monoepoxides which cure polyepoxides to form products having excellent hot hardness and solvent resistance and good adhesion. These and other objects will be apparent from the following detailed description thereof.

It has now been discovered that these and other objects may be accomplished by the novel compositions of the invention comprising complex soluble adducts of aromatic polyamines and monoepoxides having a terminal epoxy group which are prepared by heating the monoepoxide with the aromatic polyamine in a molar ratio of more than 1:2. Surprisingly, the complex soluble adducts prepared by this method are liquid and can be easily dispersed in liquid compositions containing polyepoxides. In addition, they are very active curing agents for the polyepoxides and give cured products having unexpectedly higher hot hardness values, excellent solvent resistance, good adhesion and good electrical properties.

It has also been found that these complex adducts readily combine with the polyepoxides to form a product which is soluble and fusible, and retains this state of cure for a relatively long period of time. This fusible product is particularly useful in commercial applications such as laminating and molding as will be evident from the description given hereinafter.

The aromatic polyamines used in preparing the adducts are those having one or more aromatic nuclei to which are attached a plurality of amino nitrogen atoms, at least two of which are primary amino groups. The amino groups need not be but preferably are attached to the same aromatic nucleus. Examples of the aromatic polyamine that may be used include, among others, ortho, meta and para-phenylene diamine, diaminodiphenylmethane, p,p'-methylene dianiline, p-p'-diamino diphenyl sulfone, triaminobenzene, 2,4-miaminotoluene, 3,3'-diamino diphenyl, 1,3-diamino-4-isopropylbenzene, 1,3-diamino, 4,5-diethyl benzene, diaminostilbene, and the like. The aromatic polyamines preferably contain no other group reactive with the epoxy group than the amino groups. Particularly preferred aromatic polyamines include those of the formulae $$X(NH_2)_n \text{ and } (NH_2)_mX\text{---}R\text{---}X(NH_2)_m$$

wherein X is a polyvalent aromatic hydrocarbon radical, preferably containing from 6 to 12 carbon atoms, R is a bivalent aliphatic hydrocarbon radical, preferably containing 1 to 6 carbon atoms, $n$ is an integer of at least 2, and preferably 2 to 4, and $m$ is an integer of at least 1, and preferably 1 to 3.

M-phenylene diamine is especially preferred as the aromatic polyamine, particularly because of the exceptionally superior activity of the resulting adducts as curing agents for the polyepoxides.

Mixtures of the aromatic polyamines may also be used, and in some cases it is desirable to use such mixtures. Thus, mixtures of normally solid diamines, or of a normally solid and a normally liquid diamine, may be prepared in such proportions that they are liquid at the normal working temperatures. Eutectic mixtures are advantageous on occasion. For example, a mixture of about 70 to 80% meta-phenylene diamine and 20 to 30% ortho-phenylene diamine has a melting point of only about 43° C. and is useful for this reason. Other desirable eutectics include the mixture of meta-phenylene diamine and meta-aminophenol containing about 63% of the former which melts at about 24° C., and the mixture of meta-phenylene diamine and meta-dinitrobenzene containing about 55% of the former and melts at 37° C. Mixture of meta-phenylene diamine and p,p'-diaminodiphenylmethane (p,p'-methylene dianiline) in weight ratios between about 40:60 and 80:20 are especially desirable. A eutectic mixture of from 60 to 70% meta-phenylene diamine and 40 to 30% p,p'-diaminodi-phenyl methane is a stable liquid for 5 to 6 days at 20 to 30° C. after preparation. More complex eutectic mixtures containing meta-phenylene diamine and two or more other substances may also be used.

The compound reacted with the above-described aromatic polyamines to form the complex soluble adducts of the invention comprise those organic compounds having a single epoxy group, in terminal position, i.e., compounds having a single

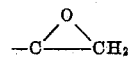

group. These compounds may be aliphatic, cycloaliphatic, aromatic, or heterocyclic and may be saturated or unsaturated. They may also be substituted with substituents which do not react with amino groups or epoxy groups, e.g., ether and ester radicals, halogen atoms. Examples of these monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, 1-heptylene oxide, 3-ethyl-1,2-pentylene oxide, epichlorohydrin, decylene oxide, octadecylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxy propionate, butyl 1,2-epoxy propionate and the like.

Preferred monoepoxides to be used to prepare the new adducts comprise the monoepoxy-substituted hydrocarbons containing no more than 12 carbon atoms, the monoepoxy substituted alkyl ethers of hydrocarbon monohydric alcohols or phenols containing no more than 12 carbon atoms, and the monoepoxy-substituted alkyl esters of hydrocarbon monocarboxylic acids, the epoxy-substituted alkyl esters of hydrocarbon polycarboxylic acids wherein the other carboxyl groups are esterified with alkanols, alkyl and alkenyl esters of 1,2-epoxy monocarboxylic acids, epoxyalkyl ethers of polyhydric alcohols wherein the other OH groups are esterified or etherified with hydrocarbon acids or alcohols and monoesters of polyhydric alcohols and 1,2-epoxy monocarboxylic acids wherein the other OH groups are esterified or etherified with hydrocarbon acids or alcohols.

Especially preferred are the glycidyl monoethers of aromatic hydrocarbon phenols or aliphatic hydrocarbon alcohols containing no more than 8 carbon atoms and monoepoxy-substituted hydrocarbon containing no more than 10 carbon atoms.

The adducts are prepared by combining any one or more of the above-described polyamines with one or more of the above-described monoepoxides and heating the resulting mixture. The mixture is preferably heated at temperatures between 50° C. and 150° C. and more preferably 80° C. and 200° C. for a short period and then allowed to stand. The reaction is usually effected under atmospheric pressure although superatmospheric pressure may be used especially with low monoepoxides and/or amines.

In order to obtain the desired novel adducts instead of gelled resinous masses which are useless as curing agents, it is necessary that an important detail be observed, namely, that a proper proportion of reactants be used. The complex soluble adducts having superior properties as curing agents are obtained only when one mole of the monoepoxide is reacted with greater than two moles of the aromatic polyamine. Preferably one mole of the monoepoxide is reacted with at least 2.2 moles of the polyamine.

The amount of the polyamine used should generally not exceed 10 mols per mol of monoepoxide and preferably not more than 5 mols, otherwise the adduct fails to possess the above advantage as curing agents for polyepoxides.

In view of the critical character of the proportion of reactants, it is preferred to add the monoepoxide to the polyamine.

If the polyamine or monoepoxide is very viscous or solid, it may be desirable to effect the reaction in an inert solvent for the reactants and product. Dioxane and diethyl ether are particularly useful for this purpose.

The novel adducts of the invention are viscous liquids of syrups. They are characterized by being soluble in organic solvents, such as, dioxane, and by being permanently fusible, i.e., are not converted on heat to a resinous mass. They are not simple compounds but have a complex structure, which structure is in part responsible for their unexpected superior properties as curing agents for polyepoxides.

The polyepoxides may be cured with the new adduct of the invention by merely mixing the two components together. The reaction occurs slowly at temperatures as low as about 20° C. and for best results it is best to heat the mixture between about 50° C. and about 280° C. Particularly preferred temperatures range from about 80° C. to about 200° C. With small castings it is preferred to cure for about 2 hours at about 80–100° C., and then post cure for an additional 2 hours or so at about 140 to about 225° C.

As indicated above, use of the above-described adducts permits resinification of the polyepoxide in several stages. When the adduct reacts with the polyepoxide, there is first formed a resinous product which is fusible and soluble in acetone. Continued curing then gives the final resinous product which is characterized by being hard and infusible. At elevated curing temperatures, the different stages of cure flow from one to the other without interruption. However, it is often useful to arrest the curing reactions before infusibilization occurs. This is accomplished by cooling below a temperature of about 40° C. Although the fusible resinous product does not appear to have indefinite life in the state of fusibility at such low temperature, it does remain readily fusible for a number of weeks when kept at about 20° C. to 25° C., and it also remains soluble in acetone during this period. This unique property of the fusible resinous product along with its normally solid, non-tacky character makes it very useful.

The amount of adduct employed in the cure of the polyepoxide may vary over a considerable range. Amounts of the adduct can range from about 5 parts per 100 parts of polyepoxide up to 40 parts per 100 parts of polyepoxide. Best results are obtained, however, when the adduct is employed in amounts varying from 10 to 30 parts per 100 parts of polyepoxide.

In curing the polyepoxides, it is usually desirable to have the polyepoxide in a mobile condition when the adduct is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide.

Various other ingredients may be mixed with the polyepoxide subjected to cure with the novel adducts including pigments, fillers, dyes, plasticizers, resins, and the like.

One important application of the use of the new adducts as curing agents for polyepoxides is in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous material are first impregnated with the mixture of the polyepoxide and adduct. This is conveniently accomplished by dissolving the adduct in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20° C. to 25° C. A plurality of the impregnated sheets are then superimposed and the assembly is cured in a heated press under a pressure of about 25 to 500 or more pounds per square inch. The resulting laminate is extremely strong and resistant against the action of organic and corrosive solvents.

Another important use of the invention is the production of molded articles. A molding powder is first prepared by milling together a mixture of the polyepoxide and the adduct with customary fillers and mold release agents. Usually the milled mixture is set up so that the fusible resin is contained therein. The milled mixture is then ground and molded articles are prepared therefrom with conversion of the fusible resin into the infusible state with the use of molding machines such as those for compression molding or transfer molding. If desired, the fusible milled mixture may be prepared in pre-form pellets and the like.

The polyepoxides to be cured by use of the above process are those organic compounds containing a plurality of epoxy groups, i.e.,

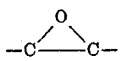

groups. These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type of polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, 1,4 - bis(2,3 - epoxypropoxy)benzene, 1,3-bis(2,3-epoxypropoxy)benzene, 4,4' - bis(2,3 - epoxypropoxy)diphenyl ether, 1,8 - bis(2,3 - epoxypropoxy)octane, 1,4 - bis(2,3-epoxypropoxy)cyclohexane, 4,4' - bis(2 - hydroxy - 3,4'-epoxybutoxy)diphenyl - dimethylmethane, 1,2 - bis(4,5-epoxypentoxy) - 5 - chlorobenzene, 1,4 - bis(3,4-epoxybutoxy)-2-chlorocyclohexane, 1,3-bis(2-hydroxy-3,4-epoxybutoxy)benzene, 1,4 - bis(2 - hydroxy-4,5-epoxypentoxy)-benzene.

Other examples include the epoxy polyethers of polyhydric phenols obtained by reacting a polyhydric phenol with a halogen containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl) propane (Bisphenol A), 2,2-bis(4-hydroxy-phenol)butane, 4,4'-dihydroxybenzophenone, bis(4-hydroxyphenyl) ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

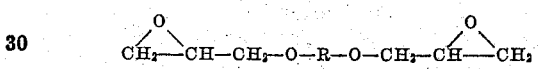

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

*Polyether B*

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

*Polyether C*

About 228 parts of 2,2-bis(4-hydroxyphenyl)propane and 84 parts sodium hydroxide as a 10% aqueous solution were combined and heated to about 45° C. whereupon 176 parts of epichlorohydrin was added rapidly. The temperature increased and remained at about 95° for 80 minutes. The mixture separated into a two-phase system and the aqueous layer is drawn off. The resinous layer that remained is washed with hot water and then drained and dried at a temperature of 130° C. The Durrans' Mercury Method melting point of the resulting product is 52° C. and the molecular weight is about 710. The product has an epoxy value of 0.27 eq./100 g.

*Polyether D*

By using a smaller ratio of epichlorohydrin to 2,2-bis(4-hydroxyphenyl)propane a glycidyl polyether of higher melting point was obtained. Thus, Polyether D was obtained in the same manner as Polyether C except that for every mole of 2,2-bis(4-hydroxyphenyl)propane, there was used 1.57 moles of epichlorohydrin and 1.88 moles of sodium hydroxide. This provided a product having a melting point of about 70° C., a molecular weight of 900 and an epoxide value of 0.20 eq./100 g.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' Mercury Method softening point no greater than 60° C.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides comprise the glycidyl ethers of novalac resins which resins are obtained by condensing an aldehyde with a polyhydric phenol. A typical member of this class is the epoxy resin from formaldehyde 2,2-bis(5-hydroxyphenol)propane novalac resin which contains as predominant constituent the substance represented by the formula

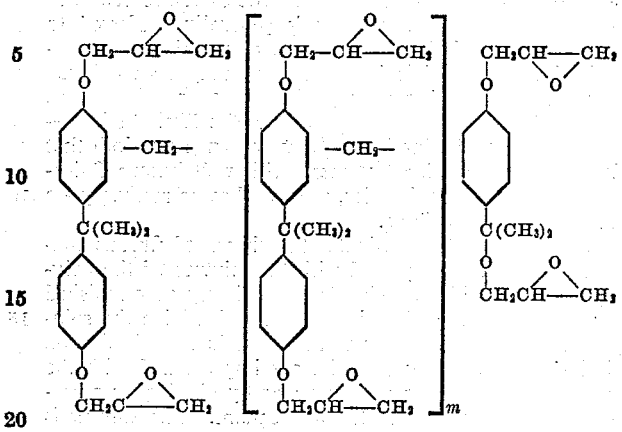

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

A further group of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl acohol, inositol, trimethylolpropane, bis(4-hydroxycyclohexyl) dimethylmethane, 1,4-dimethylolbenzene, 4,4'-dimethyloldiphenyl, dimethyloltoluenes, and the like. The polyhydric ether alcohols include, among others, diglycerol, triglycerol, dipentaerythritol, tripentaerythritol, dimethylolanisoles, beta-hydroxyethyl ethers of polyhydric alcohols, such as diethylene glycol, polyethylene glycols, bis(betahydroxyethyl ether) of hydroquinone, bis(beta-hydroxyethyl ether) of bisphenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxy-diethyl sulfide, 2,2'-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alphamonothioglycerol, alpha,alpha-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

The preparation of some of these polyepoxy polyethers may be illustrated by the following:

PREPARATION OF GLYCIDYL POLYETHERS OF POLYHYDRIC ALCOHOLS

Polyether E

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether E.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Other polyepoxide compounds include the polymers and copolymers of the epoxy-containing monomers possessing at least one polymerizable ethylenic linkage, such as, for example, allyl glycidyl ether. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxystyrene).

These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

Polyether F

About 100 parts of allyl glycidyl ether was heated at 155° C. in a glass flask and ditertbutyl peroxide added incrementally for 15 hours until 3% had been added. Excess monomer was removed, leaving 36 g. of polymer. The poly(allyl glycidyl ether) obtained as the resulting product had a molecular weight of about 481–542 and an epoxy value of 0.50 eq./100 g. and a viscosity of 15 poise. For convenience, this product will be referred to hereinafter as Polyether F.

Particularly preferred members of the above-described group comprise the polymers and copolymers of the 2-alkenyl glycidyl ethers having a molecular weight between 300 and 1000 and an epoxy equivalency greater than 1.0 and preferably between 1.2 and 6.0.

Of special interest are the polyepoxides containing elements only of the group consisting of carbon, hydrogen, oxygen and chlorine.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE I

This example illustrates the preparation and some of the properties of an adduct of meta-phenylene diamine and styrene oxide.

(A) 1000 parts of meta-phenylene diamine was broken up into small lumps and combined with 500 parts of styrene oxide in a reaction vessel equipped with agitator and thermometer. The mixture was heated to 150° F. At this point, the heat was removed and the reaction allowed to proceed without applying external cooling. The exotherm carried the temperature to about 355° F. The resulting product was a heavy light brown syrup soluble in dioxane.

When the above process was repeated with the styrene oxide and meta-phenylene diamine in a weight ratio of 3:1 and 1:1, however, the mixture set to an insoluble gel.

(B) 12.5 parts of the soluble adduct prepared under A above was blended with 50 parts of Polyether A at room temperature and the mixture cured in an oven at 65° C. for 1¼ hours and post cured in an oven at 150° C. for 6 hours.

A similar casting was prepared from Polyether A and 12.5 parts of meta-phenylene diamine as curing agent.

(C) The castings prepared with the aid of the soluble adduct described above were immersed in acetone and allowed to stand for 64 hours and for 168 hours. The weights and Barcol hardness before and after immersion were noted.

| Original | | After 64 hours' immersion, percent increase in weight | After 168 hours' immersion | |
|---|---|---|---|---|
| Barcol | Barcol | | Barcol | Percent increase |
| 45–50 | 40–45 | 0.00 | 35–40 | 0.223 |

The castings prepared from Polyether A and meta-phenylene diamine were also placed in acetone for 64 hours and the barcol hardness values and gain in weight determined. The results are shown below:

| Original—Barcol | After 64 hours in acetone | |
|---|---|---|
| | Barcol | Percent increase in weight |
| 42 | 20 | 1.6 |

(A) The preparation in Example IA was repeated with the exception that the meta-phenylene diamine and styrene oxide were combined in a mol ratio of 3:1. The resulting product was a viscous liquid adduct which was soluble in dioxane.

100 parts of Polyether B heated to 65° C. with addition of 20 parts of the above described adduct, followed by cure in an air oven at about 115° C. for an hour, yields a hard resin having excellent resistance to solvents, such as acetone.

EXAMPLE III

This example illustrates the preparation and some of the properties of the adduct of meta-phenylene diamine and phenyl glycidyl ether.

(A) 1000 parts of meta-phenylene diamine and 500 parts of phenyl glycidyl ether were added to a reaction vessel equipped with agitator and thermometer. The mixture was heated to 150° F., the heat removed and the reaction allowed to proceed without applying external cooling. The exotherm carried the temperature to 299° F. The resulting product was a light brown syrup soluble in dioxane.

(B) 12.5 parts of the soluble adduct prepared under A above was blended with 50 parts of Polyether A at room temperature and the mixture cured in an oven at 65° C. for 1¼ hours and post cured in an oven at 150° C. for 6 hours. The castings were then placed in an oven and the temperature raised slowly and hot barcols noted in each case. Results are indicated below:

| R.T. | Barcol hot hardness values at indicated temperatures | | |
|---|---|---|---|
| | 125° C. | 130° C. | 135° C |
| 45–50 | 20–25 | 10–15 | 0–5 |

After these hot barcol tests had been run, the same castings were immersed in acetone and allowed to stand for 64 hours and for 168 hours. The weights before and after immersion and Barcol before and after immersion were noted.

| Original Barcol | After 64 hours | | After 168 hours | |
|---|---|---|---|---|
| | Barcol | Percent increase in weight | Barcol | Percent increase in weight |
| 45–50 | 35–45 | 0.128 | 25–30 | 0.274 |

EXAMPLE IV

This example illustrates the preparation and some of the properties of the adduct of meta-phenylene diamine and allyl glycidyl ether.

(A) 1000 parts of meta-phenylene diamine and 500 parts of allyl glycidyl ether were added to a reaction vessel equipped with agitator and thermometer. The mixture was heated to 150° F. and the heat removed. The exotherm carried the temperature to 336° F. The resulting product was a light brown syrup soluble in dioxane.

(B) 12.5 parts of the soluble adduct prepared above was blended with 50 parts of Polyether A at room temperature and the mixture cured in an oven at 65° C. and then post cured at 150° C. for 6 hours. The resulting casting had a Barcol hardness of 45–50 at room temperature and after immersion in acetone for 168 hours had a Barcol hardness of 25–30.

EXAMPLE V

This example illustrates the preparation and properties of an adduct of a mixture of meta-phenylene diamine and p,p'-methylene dianiline and styrene oxide.

(A) A mixture of 2 parts of m-phenylenediamine and 1 part of p,p'-methylene dianiline was prepared by melting the solids together at 90° C. 10 parts of styrene oxide was combined with 100 parts of this mixture and combined mixture heated in the reaction vessel described in Example IA to 110–120° C. to initiate the reaction. The product on cooling was a heavy syrup which was soluble in dioxane.

(B) 12.5 parts of the above adduct was blended with 50 parts of Polyether A at room temperature and the mixture cured in an oven at 65° C. for 1¼ hours and post cured at 150° C. for 6 hours. The resulting castings had high hot hardness values and excellent resistance to solvents such as acetone.

(C) 12.5 parts of the above adduct was combined with 100 parts of Polyether B and the mixture heated to 115° C. The resulting product was a hard casting having excellent resistance to solvents.

EXAMPLE VI (A) The preparation in Example IA was repeated with the exception that the mixture of meta-phenylene diamine and methylene dianiline and the styrene oxide were combined in a mol ratio of 4:1. The resulting product was a viscous syrup soluble in dioxane.

(B) 100 parts of Polyether A is blended with 20 parts of the above adduct and the mixture cured in an oven at 65° C. The resulting casting is very hard and has excellent solvent resistance.

EXAMPLE VII

This example illustrates the preparation and properties of an adduct of a mixture of meta-phenylene diamine and p,p'-methylene dianiline and phenyl glycidyl ether.

(A) A mixture of 1 part of m-phenylene diamine and 1 part of p,p'-methylene dianiline was prepared by melting the solids together at 90° C. 10 parts of phenyl glycidyl ether was added to 100 parts of the above mixture and an exotherm developed immediately. The solution cooled to give a clear reddish brown liquid of low viscosity, e.a. 2500 centipoises.

(B) 20 parts of the above adduct was blended with 100 parts of Polyether A at room temperature and the mixture cured in for 2 hours at 80° C. plus 2 hours at 200° C. For purposes of comparison, 14 parts of m-phenylenediamine were added to a further 100 parts of Polyether A at room temperature and the mixture cured in an oven for 2 hours at 80° C. plus 2 hours at 200° C. Castings of each formulation were then immersed in a mineral oil bath and the temperature of the bath raised to 300–400° F. Shore D hardness values were then determined at various temperatures as follows:

| Temperature, °F. | Curing agent | |
|---|---|---|
| | m-Phenylenediamine | Adduct VII-A |
| 318 | 62 | 75 |
| 335 | 52 | 74 |
| 356 | 44 | 52 |
| 386 | 32 | 46 |

EXAMPLE VII

This example illustrates the use of the adduct prepared under Example VII(A) in the preparation of a glass laminate.

12.5 parts of the adduct described in Example VII(A) was blended with 50 parts of Polyether A and the mixture thinned to a viscosity of about 60% solids with acetone. 181 Volan A glass cloth was then impregnated with this solution and the wet impregnated cloth dried for about 30 minutes at a temperature of about 90° C. This serves only to remove the acetone used during the impregnation but to advance the resin to a "B" stage. After cooling, the cloth was dry and tack-free. The cloth may be kept for several days at room temperature without loss of flow. Several sheets of the impregnated cloth were then placed together and cured for 18 minutes at 290° F. To prevent excessive squeeze-out, only contact pressure was applied during the first few minutes of cure. A pressure of about 200 p.s.i. was applied during the remaining minutes of cure.

The following table gives properties of the resulting laminate:

| | P.s.i. |
|---|---|
| Ultimate flexural strength at 25° C. | 100,000 |
| Modulus at 25° C. | $3.7 \times 10$ |
| Ultimate flexural strength at 121° C. | 68,600 |
| Modulus at 121° C. | $3.4 \times 10^6$ |

EXAMPLE IX (A) 200 parts of the mixture of m-phenylene diamine and p,p'-methylene dianiline prepared in Example VII(A) above was combined with 20 parts of allyl glycidyl ether and the mixture heated to 150° F. and then allowed to cool. The resulting product was a heavy syrup which soluble in dioxane.

(B) 12.5 parts of the above adduct was blended with 100 parts of Polyether A at room temperature and the mixture cured in an oven at 65° C. The resulting product has high hot hardness values and excellent resistance to solvents.

EXAMPLE X (A) A eutectic mixture of meta- and ortho-phenylene diamine is prepared by heating 80 parts of meta-phenylene diamine to 65° C. and 20 parts of the ortho isomer added. 50 parts of styrene oxide is added thereto and the mixture heated to 150° F. and allowed to cool. The product is a heavy syrup soluble in dioxane.

(B) 20 parts of the above adduct cures 100 Polyether A to form a hard solvent resistant casting.

EXAMPLE XI (A) 3000 parts of meta-phenylene diamine and 1000 parts of glycidyl propionate are placed in a reaction vessel equipped with agitator and thermometer. The mixture is heated to 150° F. and the heat then removed and the mixture allowed to cool.

(B) 12.5 parts of the soluble adduct prepared as in (A) above is blended with 50 parts of Polyether A at room temperature and the mixture cured 2 hours at 80° C. and then 2 hours at 150° C. The resulting product is a hard casting having excellent resistance to solvents.

(C) Adducts having properties related to those of the adduct in (A) above are obtained by replacing the glycidyl propionate with equivalent amounts of each of the following: glycidyl caproate, allyl glycidyl phthalate and glycidyl acrylate.

EXAMPLE XII (A) 1000 parts of p,p'-diaminodiphenylmethane and 1000 parts of phenyl glycidyl ether are placed in a reaction vessel equipped as shown in Example X. The mixture is heated to 150° F. and the heat then removed. On cooling, the product is a heavy syrup soluble in dioxane.

(B) 20 parts of the soluble adduct prepared as in (A) above is blended with 50 parts of Polyether A at room temperature and the mixture cured 2 hours at 80° C. and then 2 hours at 150° C. The resulting product is a hard casting having excellent resistance to solvents.

(C) Adducts having properties related to those of the adduct in (A) above are obtained by replacing the p,p'-diaminodiphenylmethane with equivalent amounts of each of the following: 4,4'-diaminodiphenyl, m-toluene diamine and diaminostilbene.

We claim as our invention:

1. A dioxane soluble complex adduct useful as a curing agent for polyepoxides comprising the reaction product of a monoepoxide having a terminal

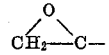

group and containing no more than 12 carbon atoms and at least one aromatic polyamine having at least two primary amine groups, and having no group reacting with 1,2-epoxy groups other than the amine groups, at least 2.2 but not more than 10 moles of polyamine being reacted with one mole of the epoxide.

2. A dioxane soluble adduct useful as a curing agent for polyepoxides comprising the reaction product of a monoepoxide having a terminal 1,2-epoxy group and containing no more than 12 carbon atoms, and an aromatic amine having two primary amino groups and having no group reactive with 1,2-epoxy groups other than the amine groups, at least 2.2 but not more than 8 moles of the diamine being combined with one mole of the monoepoxide.

3. An adduct as defined in claim 2 wherein the aromatic diamine is an amine of the Formula $X(NH_2)_2$ wherein X is a divalent aromatic hydrocarbon radical.

4. An adduct as defined in claim 2 wherein the diamine is a mixture of two different aromatic amines.

5. An adduct as defined in claim 2 wherein the diamine is m-phenylene diamine.

6. An adduct as defined in claim 2 wherein the monoepoxide is a monoepoxy-substituted hydrocarbon containing no more than 12 carbon atoms.

7. An adduct as defined in claim 2 wherein the monoepoxide is a monoepoxyalkyl ether of a phenol containing no more than 12 carbon atoms.

8. An adduct as defined in claim 2 wherein the monoepoxide is a glycidyl ester of a hydrocarbon monocarboxylic acid.

9. An adduct as defined in claim 2 wherein the monoepoxide is phenyl glycidyl ether.

10. An adduct as defined in claim 2 wherein the monoepoxide is styrene oxide.

11. An adduct as defined in claim 2 wherein the monoepoxide is allyl glycidyl ether.

12. An adduct as defined in claim 2 wherein the monoepoxide is glycidyl propionate.

13. A dioxane soluble adduct comprising the reaction product of 200 to 400 parts of a mixture of about 50 percent by weight of m-phenylene diamine and 50 percent by weight p,p'-methylene dianiline and 50 to 100 parts of phenyl glycidyl ether.

14. A fluid dioxane soluble adduct comprising the reaction product of 200 to 400 parts of a mixture of about 50 percent by weight m-phenylene diamine and 50 percent by weight p,p'-methylene dianiline and 10 to 70 parts of styrene oxide.

15. A process as in claim 16 wherein the polyamine is m-phenylene diamine and the epoxide is phenyl glycidyl ether.

16. A process comprising heating a monoepoxide having a terminal

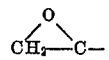

group and containing no more than 12 carbon atoms with an aromatic polyamine having at least 2 primary NH₂ groups and having no group reactive with 1,2-epoxy groups other than the amine groups, at a temperature above 50° C., at least 2.2 but not more than 10 moles of the polyamine being reacted with one mole of the monoepoxide.

17. A dioxane soluble adduct comprising the reaction product of a monoepoxide having a terminal

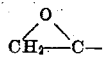

group and containing no more than 12 carbon atoms, and a mixture of m-phenylene diamine and p,p'-methylene dianiline, at least 2.2 moles but not more than 8 moles of the mixture of amines being used per mole of the monoepoxide.

References Cited in the file of this patent

UNITED STATES PATENTS

| | | |
|---|---|---|
| 2,576,458 | Hill et al. | Nov. 27, 1951 |
| 2,637,716 | Ott | May 5, 1953 |
| 2,651,589 | Shokal et al. | Sept. 8, 1953 |
| 2,662,097 | Baldwin | Dec. 8, 1953 |

FOREIGN PATENTS

| | | |
|---|---|---|
| 510,201 | Belgium | Apr. 15, 1952 |
| 681,108 | Great Britain | Oct. 15, 1952 |